United States Patent
Tomita

(10) Patent No.: US 8,658,550 B2
(45) Date of Patent: Feb. 25, 2014

(54) CERAMIC KNEADED CLAY AND USAGE THEREOF

(75) Inventor: Takahiro Tomita, Chita (JP)

(73) Assignee: NGK Insulators, Ltd., Nagoya (JP)

( * ) Notice: Subject to any disclaimer, the term of this patent is extended or adjusted under 35 U.S.C. 154(b) by 1343 days.

(21) Appl. No.: 12/416,509

(22) Filed: Apr. 1, 2009

(65) Prior Publication Data

US 2009/0214819 A1    Aug. 27, 2009

Related U.S. Application Data

(63) Continuation of application No. PCT/JP2007/069029, filed on Sep. 28, 2007.

(30) Foreign Application Priority Data

Oct. 5, 2006    (JP) .................................. 2006-274194

(51) Int. Cl.
*B32B 3/12* (2006.01)
*B32B 3/20* (2006.01)
*C04B 33/04* (2006.01)

(52) U.S. Cl.
USPC ................. 501/80; 501/81; 501/82; 501/141; 428/116; 264/630

(58) Field of Classification Search
None
See application file for complete search history.

(56) References Cited

U.S. PATENT DOCUMENTS

| | | | |
|---|---|---|---|
| 7,704,442 B2 * | 4/2010 | Noguchi et al. | 264/630 |
| 2003/0134084 A1 | 7/2003 | Ichikawa et al. | |
| 2003/0137071 A1 | 7/2003 | Noguchi et al. | |
| 2005/0221974 A1 * | 10/2005 | Tomita | 501/141 |
| 2006/0035778 A1 | 2/2006 | Tomita | |
| 2006/0290036 A1 * | 12/2006 | Kaneda et al. | 264/628 |
| 2007/0166564 A1 | 7/2007 | Morimoto et al. | |

FOREIGN PATENT DOCUMENTS

| | | |
|---|---|---|
| EP | 1736457 A1 * | 12/2006 |
| JP | B2-3227039 | 11/2001 |
| JP | A-2002-201082 | 7/2002 |
| JP | A 2002-326879 | 11/2002 |
| WO | WO 2005/094967 A1 | 10/2005 |
| WO | WO 2005/095302 A1 | 10/2005 |

OTHER PUBLICATIONS

Nendo Handbook (Handbook on Clays); 1987; $2^{nd}$ edition; Gihodo Shuppan Co., Ltd.
Jinkou nendo (Artificial clay); $10^{th}$ year anniversary issue of Jinkou nendo kenkyu-kai (Artificial clay study group); 1999.
Miller et al.; "The Use of Montmoreillonites as Extrusion Aids for Alumina;" Ceram. Eng. Sci. Proc.; 1991; pp. 33-48; vol. 12.
Jul. 30, 2012 Office Action issued in European Patent Application No. 07828770.3.
Nov. 29, 2011 Search Report issued in European Patent Application No. EP 07 82 8770.

* cited by examiner

*Primary Examiner* — David Sample
(74) *Attorney, Agent, or Firm* — Oliff PLC

(57) ABSTRACT

An oxide-ceramic forming clay comprising an oxide-ceramic forming material, a layered double hydroxide, a pore-forming agent, and water, wherein the amount of the pore-forming agent is between 3 and 50 parts by mass by superaddition to 100 parts by mass of a sum of the oxide-ceramic forming material and the layered double hydroxide and a sum of the pore-forming agent and an organic binder is between 5 and 55 parts by mass also by superaddition which has environment-friendly characteristics in a forming firing step, and usage thereof.

20 Claims, No Drawings

CERAMIC KNEADED CLAY AND USAGE THEREOF

TECHNICAL FIELD

The present invention relates to a ceramic kneaded clay and usage thereof and especially to a ceramic formed article obtained by forming the ceramic kneaded clay, a ceramic structure manufactured by use of the ceramic formed article, and a manufacturing method thereof. More specifically, the present invention relates to a ceramic kneaded clay which enables suppression of usage of an organic binder which is inevitably used, and on the other hand, enables usage of sufficient amount of pore-forming agent enough to realize desired porosity depending on the usage, and as a whole enables to suppress an amount of organic material used so that $CO_2$ or a toxic gas generated in calcinations or firing is reduced to prevent or suppress environmental pollution or global warming, while enabling to obtain a honeycomb structure having smaller defects such as a crack and a high strength by use of the ceramic kneaded clay including reduced water amount which was not adopted in a conventional art because of an increased risk of generating cracks or the like during firing, and a high fluidity, a ceramic formed article formed by the ceramic kneaded clay, a ceramic structure having a high strength obtained by firing the ceramic formed article, and effective manufacturing method of all of the above, in manufacturing a ceramic structure used as a substrate for filtering for purifying an exhaust gas or purification of water, or as a carrier of a catalyst.

TECHNICAL BACKGROUND

Forming of a ceramic goods is generally carried out by a method such as wheel shaping, extrusion forming, injection forming, press forming, and sheet forming. However, because fluidity, shape retaining property, or the like which is necessary for the forming cannot be obtained if ceramics substrate powder alone is used, water, an organic binder, or the like is added to obtain a ceramics forming material and subsequently, forming is carried out. For example, a manufacturing method of a ceramic structure has been disclosed. According to this method, in the extrusion forming, a ceramics substrate, water, an organic binder, and the like are mixed, a forming material (clay) having improved formability is extrusion formed, and the clay thus extrusion formed is dried and fired (e.g., refer to Patent Document 1).

Formability of ceramics is improved if an additive amount of an organic binder or a surfactant which gives fluidity or shape retention property to a shaped body is increased. For example, to shape form a large-scale structure for DPF or a structure having a complex cell structure used for a water clarification apparatus, which has been increasingly in demand in recent years, by extrusion forming, a clay paste (clay) having superior formability to a clay used for manufacturing a small-sized or a simple-structured ceramic structure is required and as a result, it is inevitable to add more organic binder or surfactant.

However, if the additive amount of the organic binder becomes large, because the organic binder is burned in the firing, there is a problem that a space occupied by the organic binder in forming becomes a defect and mechanical strength of the structure is decreased. Moreover, in a large-scale structure, when the organic binder is burned in the firing, temperature inside the structure is elevated by the heat of combustion and due to thermal stress caused by difference in temperature between inside and outside of the structure, a defect such as a crack is generated. Not only does this lower mechanical strength of the structure, but this also significantly decreases yield. Further, $CO_2$ or a toxic gas is generated by burning the organic binder in the firing and is released in the atmosphere, causing an environmental problem such as air pollution or global warming. Regarding the surfactant, it is true that the surfactant potentially has a basically same problem as that of the binder because the surfactant is also an organic.

Meanwhile, to ensure a desired porosity in a structure after firing which is a final product, especially in a large-scale structure for DPF or a structure having a complex cell structure used for a water clarification apparatus, it is necessary to use a larger amount of pore-forming agent in the substrate compared to a structure used for a general purpose. As a result, from a viewpoint of ensuring fluidity of a clay obtained by mixture, it is necessary to increase the amount of the organic binder, the surfactant, and water. However, if the amount of water added is increased to ensure fluidity, drying time is increased in a following drying step. Moreover, if the shape of the product becomes too large compared to a conventional product, moisture in the product is varied during drying and as a result a fine crack is partially generated during the drying to generate a problem such as triggering a crack in a final product. Therefore this is not preferable. In addition, in a case where the clay obtained by mixture includes much pore-forming agent, there is a problem that when a shaped body obtained by forming is calcinated for purpose of removing a binder, other organic such as the pore-forming agent is simultaneously removed and therefore strength of the calcinated body thus obtained tends to be low.

Meanwhile, clay as a substrate of a ceramic ware (potter's clay or the like) has a plasticity which enables forming even without including the above-mentioned organic binder. A factor for the clay to express the plasticity includes conditions such as a fine grain of the clay which has a flat or needle-like shape and generates hydrogen bond to water, and the like (refer to non-patent document 1). A compound having such characteristics is added to a ceramic substrate powder similarly to a conventional organic binder in a try to give plasticity to a ceramic substrate clay (refer to non-patent documents 2 and 3).

However, there is a problem that naturally produced bentonite, smectite, and the like disclosed in the above-mentioned non-patent documents 1 to 3 which are clay minerals having plasticity include lots of impurity and are expected to be depleted. Moreover, artificial ones or purified natural minerals are more expensive relatively to an organic binder.

Patent Document 1: Japanese Patent Publication No. 3227039
Non-patent Document 1: Nendo Handbook (Handbook on Clays) $2^{nd}$ edition, (Gihodo Shuppan Co., Ltd. 1987)
Non-patent Document 2: Jinkou nendo (Artificial clay) ($10^{th}$ year anniversary issue of Jinkou nendo kenkyu-kai (Artificial clay study group))
Non-patent Document 3: The use of Montmorillonites as Extrusion Aids for Alumina, Ceram, Engi. Sci. Proc. 12 [1-2] pp. 33-48 (1991)

DISCLOSURE OF THE INVENTION

The present invention has been made in consideration of the above-mentioned problems and is aimed at providing a ceramic kneaded clay which enables to ensure fluidity and shape retaining property requested in forming, to maintain strength of a calcinated body after calcinations as well as to prevent or suppress environmental pollution or global warming by preventing or suppressing generation of $CO_2$ or a toxic gas in firing, and at the same time, to obtain a ceramic structure having smaller defects such as a crack, a high strength, and a desired porosity, a ceramic formed article formed by the ceramic kneaded clay, a ceramic structure having a high strength, especially a large-scale ceramic structure having a high strength, obtained by firing the ceramic formed article, and effective manufacturing method of all of the above.

To achieve the above-mentioned purpose, following ceramic kneaded clay, ceramic formed article, highly strong ceramic structure, and effective manufacturing methods thereof will be provided by the present invention.

[1] An oxide-ceramic forming clay including an oxide-ceramic forming material, a layered double hydroxide, a pore-forming agent, and water, wherein the amount of the pore-forming agent is between 3 and 50 parts by mass by superaddition to 100 parts by mass of a sum of the oxide-ceramic forming material and the layered double hydroxide and a sum of the pore-forming agent and an organic binder is between 5 and 55 parts by mass also by superaddition, the layered double hydroxide is a layered double hydroxide expressed by the following formula (I):

$$[M^{2+}_{1-x}M^{3+}_x(OH)_2][A^{n-}_{x/n} \cdot yH_2O] \quad (I)$$

(in the formula (I), $M^{2+}$, $M^{3+}$, and An respectively express bivalent cation, trivalent cation, or anion, n expresses valence of anion and $1 \leq n \leq 3$, x expresses composition ratio of trivalent cation in a sum of the bivalent cation ($M^{2+}$) and the trivalent cation ($M^{3+}$) and at the same time expresses a value within a range of between 0.1 and 0.4, and y expresses number of moles of water), and sheet extrusion pressure is 20 MPa or less.

[2] The oxide-ceramic forming clay according to [1], wherein a true stress is at least 10 kPa when true strain is 0.2 in a uniaxial compression test of the oxide-ceramic forming clay.

[3] The oxide-ceramic forming clay according to [1] or [2], wherein mass of the layered double hydroxide occupies 0.5 to 50 parts by mass to 100 parts by mass of a sum of the oxide-ceramic forming material and the layered double hydroxide.

[4] The oxide-ceramic forming clay according to any one of [1] to [3], wherein mass of the layered double hydroxide occupies 1 to 18 parts by mass in 100 parts by mass of a sum of the oxide-ceramic forming material and the layered double hydroxide.

[5] The oxide-ceramic forming clay according to any one of [1] to [4], wherein the oxide-ceramic forming clay further includes at least one of a dispersant, a plasticizer, and a surfactant and a total content thereof is less than 0.2 parts by mass by superaddition to 100 parts by mass of the sum of the oxide-ceramic forming material and the layered double hydroxide.

[6] The oxide-ceramic forming clay according to any one of [1] to [5], wherein the layered double hydroxide is hydrotalcite which is expressed by the following formula (II):

$$Mg_{1-z}Al_z(OH)_2(CO_3)_{z/2} \cdot mH_2O \quad (II)$$

(In the above formula (II), z expresses composition ratio of Al in a sum of Mg and Al and also expresses a value within a range of between 0.1 and 0.4, and m expresses a number of moles of water in the hydrotalcite.)

[7] The oxide-ceramic forming clay according to any one of [1] to [6], wherein the layered double hydroxide is hydrotalcite which is expressed by the following formula (III):

$$(Mg^{2+})_6(Al^{3+})_2(OH^-)_{16}CO_3^{2-} \cdot 4H_2O \quad (III)$$

[8] An oxide-ceramic formed article obtained by extrusion forming the oxide-ceramic forming clay according to any one of [1] to [7].

[9] The oxide-ceramic formed article according to [8], wherein the formed article is formed to have a honeycomb shape by extrusion forming.

[10] An oxide-ceramic structure obtained by firing the oxide-ceramic formed article according to either [8] or [9].

[11] A manufacturing method of an oxide-ceramic kneaded clay for obtaining an oxide-ceramic forming clay by mixing a formation substrate including a ceramic forming material which includes:

a step of preparing an oxide-ceramic forming material and a layered double hydroxide as the ceramic forming material so that sum of the two becomes 100 parts by mass; and a step of preparing a pore-forming agent so that amount thereof is between 3 and 50 parts by mass by superaddition to 100 parts by mass of the prepared oxide-ceramic forming material and a sum of the pore-forming agent and an organic binder becomes between 5 and 55 parts by mass also by superaddition, wherein a layered double hydroxide expressed by the following formula (I) is used as the layered double hydroxide:

$$[M^{2+}_{1-x}M^{3+}_x(OH)_2][A^{n-}_{x/n} \cdot yH_2O] \quad (I)$$

(in the formula (I), $M^{2+}$, $M^{3+}$, and $A^{n-}$ respectively express bivalent cation, trivalent cation, or anion, n expresses valence of anion and is $1 \leq n \leq 3$, x expresses composition ratio of trivalent cation in a sum of the bivalent cation ($M^{2+}$) and the trivalent cation ($M^{3+}$) and at the same time expresses a value within a range of between 0.1 and 0.4, and y expresses number of moles of water), and sheet extrusion pressure is 20 MPa or less.

[12] The manufacturing method of an oxide-ceramic forming clay according to [11], wherein a true stress is at least 10 kPa when the true stress necessary for the oxide-ceramic forming clay to provide true strain of 0.2 in a uniaxial compression test is examined.

[13] The manufacturing method of an oxide-ceramic forming clay according to either [11] or [12], wherein the layered double hydroxide is prepared so that content thereof in the ceramic forming material is between 0.5 and 50 parts by mass.

[14] The manufacturing method of an oxide-ceramic forming clay according to any one of [11] to [13], wherein hydrotalcite which is expressed by the following formula (II) is used as the layered double hydroxide:

$$Mg_{1-z}Al_z(OH)_2(CO_3)_{z/2} \cdot mH_2O \quad (II)$$

(In the above formula (II), z expresses composition ratio of Al in a sum of Mg and Al and also expresses a value within a range of between 0.1 and 0.4, and m expresses a number of moles of water in the hydrotalcite.)

[15] The manufacturing method of an oxide-ceramic forming clay according to any one of [11] to [14], wherein hydrotalcite which is expressed by the following formula (III) is used as the layered double hydroxide:

$$(Mg^{2+})_6(Al^{3+})_2(OH^-)_{16}CO_3^{2-} \cdot 4H_2O \quad (III)$$

[16] A manufacturing method of a ceramic formed article for obtaining a ceramic formed article by forming the oxide-ceramic forming clay obtained by the method according to any one of [11] to [15].

[17] The manufacturing method of a ceramic formed article according to [16] wherein the ceramic forming clay is shaped to have a honeycomb shape so that a formed honeycomb article is obtained.

[18] A manufacturing method of a ceramic structure for obtaining a ceramic structure by firing the ceramic formed article obtained by a method according to any of [15] to [17].

THE BEST MODE FOR CARRYING OUT THE CLAIMED INVENTION

Hereinafter preferred Examples of the present invention will be explained in detail.

A ceramic kneaded clay of the present invention includes characteristics that although the ceramic kneaded clay of the present invention includes more pore-forming agent compared to a conventional one, the ceramic kneaded clay can ensure fluidity required when forming, especially when extrusion forming is carried out, while controlling the amount of water of the ceramic kneaded clay obtained by mixing forming material to the minimum. To prepare an oxide-ceramic forming clay which fulfills such contradictory requirements and has superior fluidity, it is crucial to add a pore-forming agent with an amount that is between 3 and 50 parts by mass by superaddition to 100 parts by mass of a sum of the oxide-ceramic forming material and the layered double hydroxide while a sum of the pore-forming agent and an organic binder is between 5 and 55 parts by mass also by superaddition, and to use a layered double hydroxide expressed by the following formula (I) as the layered double hydroxide:

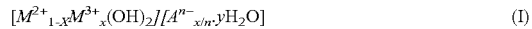

$$[M^{2+}{}_{1-x}M^{3+}{}_{x}(OH)_2][A^{n-}{}_{x/n}\cdot yH_2O] \qquad (I)$$

(in the formula (I), $M^{2+}$, $M^{3+}$, and $A^{n-}$ respectively express bivalent cation, trivalent cation, or anion, n expresses valence of anion and is $1 \leq n \leq 3$, x expresses composition ratio of trivalent cation in a sum of the bivalent cation ($M^{2+}$) and the trivalent cation ($M^{3+}$) and at the same time expresses a value within a range of between 0.1 and 0.4, and y expresses number of moles of water). Here, among various substrates including the ceramic forming material and the binder used for preparation of the ceramic kneaded clay of the present invention, amount of powder (solid) to be used will be shown on the basis of the mass when received.

In the present invention, as a substrate for preparing an oxide-ceramic forming clay, in addition to a predetermined amount of an oxide-ceramic forming material, a layered double hydroxide, an organic binder, a pore-forming agent, and water as a dispersion medium, a dispersant or the like may be used depending on the usage.

In a case where the oxide-ceramic forming clay (hereinafter, may be simply referred to as ceramic kneaded clay) is used to manufacture a ceramic structure, the ceramic forming material in the ceramic kneaded clay constructs the ceramic structure after the ceramic kneaded clay is shape formed to be a ceramic formed article and the ceramic formed article is fired. The oxide-ceramic forming material includes, for example, alumina, mullite, zirconia, titania (titanium oxide) each of which is an oxide by itself, or aluminum titanate, cordierite, or the like which is a complex oxide. Moreover, the oxide-ceramic forming material includes a mixture of talc, kaolin, alumina, aluminum hydroxide, silica, magnesia, or the like which is a material to generate cordierite by firing, as well as a mixture of magnesium, aluminum, silicon, or the like and hydroxide or carbonate of magnesium, aluminum, or the like.

It is preferable that an average particle diameter of the oxide-ceramic forming material is between 0.1 and 50 μm and is more preferable if the size is between 1 and 40 μm. Moreover, it is preferable that specific surface of the oxide-ceramic forming material is between 0.05 and 50m²/g and is more preferable if the specific surface is between 0.05 and 40 m²/g.

Specifically, it is preferable that the average particle diameter and the specific surface of talc, kaolin, alumina, aluminum hydroxide, and silica in a case where cordierite is obtained by firing are within a range in Table shown below.

TABLE 1

| Ceramic forming material | Average particle diameter [μm] | Specific surface [m²/g] |
|---|---|---|
| Talc | 5 to 40 | 0.5 to 15 |
| Kaolin | 1 to 15 | 3 to 40 |
| Alumina | 1 to 15 | 0.05 to 22 |
| Aluminum hydroxide | 0.1 to 10 | 1 to 50 |
| Silica | 2 to 50 | 0.5 to 10 |

The oxide-ceramic forming material is generally used so that a sum of the oxide-ceramic forming material and the layered double hydroxide becomes 100 parts by mass. In general, it is preferable that the amount of the oxide-ceramic forming material is between 50 and 99.5 parts by mass in the 100 parts by mass which is the sum of the oxide-ceramic forming material and the layered double hydroxide. It may not be a problem if the content of the oxide-ceramic forming material is smaller than 50 parts by mass. However, in that case, there may be a case where it becomes difficult for a ceramic structure to be obtained to have a desired composition or cost for manufacturing the structure becomes a problem. In a case where the content of the oxide-ceramic forming material exceeds 99.5 parts by mass, there may be a case where it becomes difficult to carry out forming.

An organic binder is used depending on the necessity to improve fluidity and formability of the ceramic kneaded clay prepared by mixing the forming material. Moreover, in a case where the organic binder is used to manufacture a ceramic structure, the organic binder is used to perform a function as a shape retention agent to retain the shape of the structure depending on the necessity. Meanwhile, the organic binder has a problem that the binder enhances environmental pollution or global warming by generation of $CO_2$ or a toxic gas when fired, that a space occupied by the organic binder when forming is carried out becomes a defect, or causes a defect such as a crack to the ceramic structure and decreases strength of the ceramic structure. Therefore, content of the organic binder needs to be kept to minimum.

On the basis of the above, it is preferable that the amount of the organic binder is 5 parts by mass or less by superaddition to a total of 100 parts by mass of the ceramic forming material and the layered double hydroxide and is more preferable if the amount of the organic binder is 3 parts by mass or less. Here, from the viewpoint of environmental problem such as carbon dioxide gas or the like generated in calcinations or firing or viewpoint of ensuring fluidity in forming, it is necessary that the total amount of the organic binder and the pore-forming agent to be used is within a range of between 5 and 55 parts by mass by superaddition to 100 parts by mass of the sum of the ceramic forming material and the layered double hydroxide.

Such an organic binder includes, for example, an organic high molecule. Specifically, the organic binder includes hydroxypropoxy methyl cellulose, hydroxypropyl methyl cellulose, methyl cellulose, hydroxy ethyl cellulose, carboxyl methyl cellulose, polyvinyl alcohol, or the like. The organic binder may be used alone or by a combination of two or more of the above.

In the present invention, as described above, even in a case where the organic binder is used, content of the organic binder to be used is suppressed to 5 parts by mass or less to a total of 100 parts by mass of the ceramic forming material and the layered double hydroxide to solve the problems that the binder enhances environmental pollution or global warming by generation of $CO_2$ or a toxic gas when fired, a space occupied by the organic binder when forming is carried out becomes a defect, or the organic binder causes a defect such as a crack to the ceramic structure and decreases strength of the ceramic structure when the organic binder is used to manufacture a ceramic structure. For the purpose of compensating decrease in plasticity and formability of the ceramic kneaded clay caused by the above, the forming material further including a layered double hydroxide having both a ceramication function and a function to give formability is used.

Thus, according to the present invention, it becomes possible to reduce the amount of substrate which generates $CO_2$ or a toxic gas when the organic binder, the surfactant, or the like is fired when the substrate is used to manufacture a ceramic structure. Therefore, it becomes possible to contribute to suppression or prevention of environmental pollution or global warming and at the same time to significantly contribute to saving these substrates which are produced by use of precious fossil material. Moreover, from the viewpoint of manufacturing, it is highly expected that an effect of providing a ceramic kneaded clay which enables to obtain a ceramic structure having smaller defects such as a crack, a high strength, and a desired porosity, a ceramic formed article formed by the ceramic kneaded clay, a ceramic structure having a high strength, especially a large-scale ceramic structure having a high structure, obtained by firing the ceramic formed article, and effective manufacturing method of all of the above can be achieved.

In the present invention, the layered double hydroxide means one which is expressed by the following formula (I):

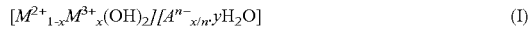

(in the formula (I), $M^{2+}$, $M^{3+}$, and $A^{n-}$ respectively express bivalent cation, trivalent cation, or anion, n expresses valence of anion and is $1 \leq n \leq 3$, x expresses composition ratio of trivalent cation in a sum of the bivalent cation ($M^{2+}$) and the trivalent cation ($M^{3+}$) and at the same time expresses a value within a range of between 0.1 and 0.4, and y expresses number of moles of water.)

The above-mentioned bivalent cation includes a bivalent metal ion such as $Mg^{2+}$, $Ca^{2+}$, $Sr^{2+}$, $Zn^{2+}$, $Ni^{2+}$, $Co^{2+}$, and $Fe^{2+}$ and one of them alone or a combination of two or more of them may be used. The above-mentioned trivalent cation includes a trivalent metal ion such as $Al^{3+}$, $Fe^{3+}$, $Cr^{3+}$, $Ti^{3+}$, $Y^{3+}$, and $Ce^{3+}$ and one of them alone or a combination of two or more of them may be used. The above-mentioned anion includes $CO_3^{2-}$, $Cl^-$, $NO_3^-$, $CH_3COO^-$, $PO_4^{3-}$, or the like and one of them alone or a combination of two or more of them may be used.

It is preferable that the layered double hydroxide used in the present invention is included with a ratio of between 0.5 and 50 parts by mass in 100 parts by mass which is a sum with the ceramic forming material, more preferably between 1 and 30 parts by mass and still more preferably between 1 and 18 parts by mass. If the content is less than 0.5 parts by mass, there may be a case where sufficient formability cannot be developed. If the content exceeds 50 parts by mass, there may be no problem. However, there may be a case where it becomes difficult for a ceramic structure to be obtained to have a desired composition. Moreover, the ceramic kneaded clay including the layered double hydroxide used in the present invention has a sheet extrusion pressure of 20 MPa or less, preferably 15 MPa or less.

Here, the sheet extrusion pressure is a pressure applied on a clay when a test is carried out by use of a machine complying JIS K7199 and is an index for fluidity. Specific method will be described later.

As the layered double hydroxide used in the present invention, a layered double hydroxide having an appropriate composition may be used depending on the type of the ceramic forming material. For example, in a case where cordierite forming material is used as the ceramic forming material, a layered double hydroxide including $Mg^{2+}$ as a bivalent cation and $Al^{3+}$ as a trivalent cation may be used. Regarding anion, an appropriate anion may be selected depending on the synthesis condition of the layered double hydroxide or the manufacturing condition of the ceramics. However, it is preferable that the anion is $CO_3^{2-}$ from the viewpoint of forming. Here, the layered double hydroxide used in the present invention may be used alone or may be used by a combination of two or more types.

Because of its fine formability, it is preferable that hydrotalcite which is expressed by the following formula (II) is used as the layered double hydroxide in the present invention:

(In the above formula (II), z expresses composition ratio of Al in a sum of Mg and Al and also expresses a value within a range of between 0.1 and 0.4, and m expresses a number of moles of water in the hydrotalcite.)

Moreover, because it is easy to obtain, it is preferable that hydrotalcite which is expressed by the following formula (III) is used as the layered double hydroxide in the present invention:

The oxide-ceramic forming clay in the present invention includes a pore-forming agent as a crucial element. Such a pore-forming agent is a template for a pore and a pore having a desired shape, size, and distribution is formed in a ceramic structure (honeycomb structure) to increase porosity so that a porous ceramic structure (honeycomb structure) having a high porosity can be obtained. Such a pore-forming agent includes, for example, graphite, flour, starch, phenol resin, polymethyl methacrylate, polyethylene, polyethylene terephthalate, resin foam (acrylonitrile series plastic balloon), water absorbing resin, or the like. These materials are burned while forming a pore. Among them, resin foam is preferable because it generates less $CO_2$ or a toxic gas and suppresses generation of a crack.

Here, the amount of the pore-forming agent to be used is between 3 and 50 parts by mass by superaddition to 100 parts by mass of a total of the oxides as a ceramic forming material and the layered double hydroxide and it is preferable if the amount is between 4.5 and 40 parts by mass. In this case, a total amount of the pore-forming agent and the organic binder is between 5 and 55 parts by mass by super addition and preferably is between 6 and 45 parts by mass. Here, in a case where the amount of the pore-forming agent exceeds 10 parts by mass by superaddition, in other words, in a case where porosity of a fired formed article, especially a fired ceramic structure (honeycomb structure) is in the vicinity of 60%, the amount of the layered double hydroxide differs depending on the type of the layered double hydroxide and on the amount of water which is a dispersant used simultaneously. However, it is preferable that at least 2 parts by mass or more, preferably 5 parts by mass or more, more preferably 10 parts by mass or more of the layered double hydroxide is used.

It is difficult to determine the ratio of water included as a dispersant because the ratio differs depending on the forming material used. However, it is preferable to adjust the amount of water so that the above-mentioned sheet extrusion pressure becomes 20 MPa or less. Generally, the content of water is between 10 parts by mass or more and less than 30 parts by mass by superaddition to 100 parts by mass of a sum of the oxide-ceramic forming material and the layered double hydroxide. If the content of water is less than 10 parts by mass, the sheet extrusion pressure cannot be 20 MPa or less and causes a problem in a forming operation. If the content exceeds 30 parts by mass, not only is the sheet extrusion pressure significantly decreased but shape retaining property may be significantly damaged and therefore this is not preferable. It is preferable that a true stress required to provide true strain of 0.2 in a uniaxial compression test of the oxide-ceramic forming clay is at least 10 kPa or more from the viewpoint of shape retention property. It is more preferable if the true stress is 20 kPa or more.

A method for mixing the above-mentioned forming material is not especially limited and, for example, a method using a kneader, a vacuum soil kneader, or the like may be used.

Shape of the ceramic formed article in the present invention is not especially limited and includes, for example, a sheet shape, a tube shape, a lotus root shape, a honeycomb shape or the like. Among them, in case of the honeycomb shape, the ceramic formed article can be appropriately used as a formed honeycomb article in which a plurality of cells are formed as two edge surfaces are penetrated by a honeycomb-shaped partition wall. In a case where the formed honeycomb article is used as a filter such as a DPF, it is preferable that the edge surfaces of cells are alternately plugged by two edge surface portions. Shape of the whole of the ceramic formed article is not especially limited and in case of the formed honeycomb article, a cylindrical shape, a quadrangular shape, a triangular shape, or the like may be used. Shape of the cell (shape of the cell in a vertical cross section to a forming direction of the cell) of the formed honeycomb article also has no limitation and a rectangular shape, a hexagonal shape, a triangular shape, or the like may be used.

There is no limitation for the method for manufacturing the ceramic formed article of the present invention and any conventionally known method such as wheel shaping, extrusion forming, injection forming, press forming, or sheet forming may be used. Among them, a method of extrusion forming the ceramic kneaded clay prepared as above by use of a mouth ring having a desired cell shape, a partition wall thickness, and cell density can be mentioned as a preferable example. There is also no limitation for the drying method and any conventionally known drying method such as hot-air drying, microwave drying, dielectric drying, reduced-pressure drying, vacuum drying, and freeze drying may be used. Among them, combination of the hot-air drying and the microwave drying or the dielectric drying is preferable because the entire formed article can be quickly and uniformly dried.

The ceramic formed article thus obtained may be calcinated (degreased) to obtain a calcinated body. Calcinations means an operation for removing organic materials (a dispersant such as binder, pore-forming agent, and surfactant) in the formed article by burning. Generally, combustion temperature of the organic binder is between 100 and 300° C. and that of the pore-forming agent is between 200 and 800° C. Therefore, temperature for calcinations may be between 200 and 1,000° C. Although time for calcinations is not especially limited, it is generally between 1 and 10 hours. Atmosphere for calcinations is selected appropriately depending on the type of the ceramic forming material. The atmosphere includes room air atmosphere, oxygen atmosphere, nitrogen atmosphere, argon atmosphere, vacuum atmosphere, and the like.

The ceramic structure of the present invention can be obtained by firing the above-mentioned ceramic formed article or calcinated body. Firing means an operation to sinter the formed article material in the calcinated body or to cause the formed article to be sintered by firing with a reaction so that a predetermined product material (crystal phase) can be obtained and strength can be ensured. Firing condition (temperature and time) differs depending on the type of the formed article material and therefore an appropriate condition may be selected depending on the type of the material. In the present invention, for example, in a case where cordierite forming material is used, it is preferable to fire the ceramic formed article at between 1,300 and 1,500° C. It is more preferable to fire the formed article at between 1,350 and 1,450° C. If the temperature is less than 1,350° C., there may be a case where a desired crystal phase (e.g., cordierite) cannot be obtained. If the temperature exceeds 1,500° C., there may be a case where the material is molten. Moreover, atmosphere for firing is selected appropriately depending on the type of the ceramic forming material. The atmosphere includes room air atmosphere, oxygen atmosphere, nitrogen atmosphere, argon atmosphere, vacuum atmosphere, and the like.

In a case where aluminum titanate forming material is used, it is preferable that the ceramic formed article is fired at between 1,300 and 1,800° C. It is more preferable to fire the formed article at between 1,400 and 1,700° C. If the temperature is less than 1,300° C., there may be a case where a desired crystal phase (e.g., aluminum titanate) cannot be obtained. If the temperature exceeds 1,800° C., there may be a case where the material is molten and a structure having a desired shape cannot be obtained.

The ceramic structure of the present invention is one obtained by the above-mentioned method and is a structure which includes highly strong ceramics (e.g., cordierite) as a major component and has less defects or cracks. A preferable composition of cordierite includes, for example, $2MgO.2Al_2O_3.5SiO_2$. Moreover, a preferable composition of aluminum titanate includes, for example, $Al_2TiO_5$, a preferable composition of alumina includes $Al_2O_3$, a preferable composition of mullite includes $3Al_2O_3.2SiO_2$, and a preferable composition of zirconia includes $ZrO_2$.

EXAMPLES

Hereinafter, the present invention will be explained more in detail by Examples. However, the present invention is not limited to these Examples.

(Evaluation Method)

Before specific explanation of the Examples, test method used in the present Example will be described.

Measurement of Sheet Extrusion Pressure

Pressure applied to clay when the clay is extruded by a certain volume flow by a machine complying JIS K7199 was measured. Here, a machine having a cylinder inner diameter of φ25 mm and a slit die cross-sectional shape of 0.3×2.5 mm was used. Oxide-ceramic forming clay was filled in a cylinder and a piston was pressed with a speed of 1 mm/min. to extrusion form a sheet from a slit die exit. A value of a pressure sensor attached to a tip of the piston is regarded as the sheet extrusion pressure. Here, according to this method, it becomes possible to illustrate formability of a part (rib) of the honeycomb structure and to evaluate fluidity. Lower sheet extrusion pressure means better fluidity of the clay and this means that the honeycomb structure can be easily shape formed. In other words, this means the clay has a high fluidity.

Uniaxial Compression Test

By use of a specimen and a machine complying JIS A1216, a true stress when true strain is 0.2 was measured. Thus, hardness of the clay to external force, that is, shape retention property, could be evaluated and a larger value means a better shape retention property of the formed article.

Quality evaluation of oxide-ceramic forming clay Quality of the oxide-ceramic forming clay was examined on three issues, forming defect, clogging at the mouth ring, and crush regarding a formed honeycomb article shape formed by extrusion forming and results thereof were evaluated. Forming defect means lack of fluidity of the clay. If the oxide-ceramic forming clay lacks fluidity, there occurs a shaggy portion on a rib of the formed article or on an outer wall thereof in a case where the formed honeycomb article is extrusion formed. Therefore, the forming defect was evaluated by checking whether or not there existed the shaggy portion on a rib or an outer wall of the formed article and degree of generation of the shaggy portion. Clogging at the mouth ring was evaluated by examining whether or not there existed cracks in a continued manner in an extrusion direction of the formed article. Crush was evaluated by examining whether or not there was a crushed cell in the formed article by eyes and by examining whether or not there existed a cell which does not allow a light to transmit due to crush when the light is irradiated from one edge surface of the formed article in the extrusion direction and is observed from the opposite direction.

Quality Evaluation in Drying and Firing

Evaluation was carried out by a degree of occurrence of dry breakage (ribs/cells which must be constructed in a continued manner are not continued after drying), breakage (ribs/cells which must be constructed in a continued manner are not continued after firing), and melting by firing (defect in shape after firing) when a formed honeycomb article to be obtained by forming the oxide-ceramic forming clay is dried and fired. They were evaluated by checking by eye whether or not there existed any externally viewable breakage on a dried body and a fired body, and by irradiating a light from one edge surface in the extrusion direction of the dried formed article and the fired formed article for observation from the other edge surface to check whether or not there existed breakage inside the product.

Quality Evaluation of Product (Ceramic Structure)

As an index for checking whether or not a ceramic structure obtained by drying and firing a formed article which was obtained by forming the oxide-ceramic forming clay was porous and highly strong, porosity (%) and A-axis compressive strength (MPa) were measured. The porosity was measured by Archimedes' method. The A-axis compressive strength was measured complying JASO M 505-87 by cutting out a columnar specimen having length in A-axis direction of 25.4 mm and a diameter orthogonal thereto of 25.4 mm from the honeycomb structure having a cell wall pressure of 12 mil and a cell pitch of 200 CPSI and by carrying out a compression test in the A-axis direction by use of an autograph.

(Selection of Layered Double Hydroxide)

In the following Examples, layered double hydroxides having various characteristics displayed in Table 2 (types: 1 to 39) were selected and used.

TABLE 2

| Type of layered double hydroxide | Average particle diameter (μm) | Amount of residue after sieving (%) | Amount of impurity (%) | Specific surface (m²/g) | Apparent specific gravity (g/cm³) | Ratio of $M^{2+}/M^{3+}$ | Type of ion between layers | $M^{2+}$ | $M^{3+}$ |
|---|---|---|---|---|---|---|---|---|---|
| 1 | 0.6 | 0.01 | 0.3 | 18 | 0.32 | 3/1 | $CO_3^{2-}$ | $Mg^{2+}$ | $Al^{3+}$ |
| 2 | 0.6 | 0.01 | 0.4 | 17 | 0.3 | 5/1 | $CO_3^{2-}$ | $Mg^{2+}$ | $Al^{3+}$ |
| 3 | 0.6 | 0.01 | 0.3 | 18 | 0.28 | 2.25/1 | $CO_3^{2-}$ | $Mg^{2+}$ | $Al^{3+}$ |
| 4 | 0.6 | 0.01 | 0.5 | 17 | 0.3 | 2/1 | $CO_3^{2-}$ | $Mg^{2+}$ | $Al^{3+}$ |
| 5 | 0.6 | 0.01 | 0.5 | 17 | 0.3 | 1.8/1 | $CO_3^{2-}$ | $Mg^{2+}$ | $Al^{3+}$ |
| 6 | 0.6 | 0.01 | 0.4 | 18 | 0.27 | 3/1 | $Cl^-$ | $Mg^{2+}$ | $Al^{3+}$ |
| 7 | 0.6 | 0.01 | 0.5 | 17 | 0.29 | 3/1 | $NO_3^-$ | $Mg^{2+}$ | $Al^{3+}$ |
| 8 | 0.6 | 0.01 | 0.4 | 16 | 0.3 | 3/1 | $CH_3COO^-$ | $Mg^{2+}$ | $Al^{3+}$ |
| 9 | 0.1 | 0.01 | 0.8 | 12 | 0.41 | 2/1 | $CO_3^{2-}$ | $Ca^{2+}$ | $Al^{3+}$ |
| 10 | 0.2 | 0.01 | 0.9 | 8 | 0.59 | 2/1 | $CO_3^{2-}$ | $Sr^{2+}$ | $Al^{3+}$ |
| 11 | 0.1 | 0.01 | 0.8 | 9 | 0.51 | 2/1 | $CO_3^{2-}$ | $Zn^{2+}$ | $Al^{3+}$ |
| 12 | 0.1 | 0.01 | 0.7 | 10 | 0.36 | 2/1 | $CO_3^{2-}$ | $Mg^{2+}$ | $Fe^{3+}$ |

Example 1

In the Example 1, kaolin, talc, alumina, aluminum hydroxide, and silica were used as an oxide-ceramic (cordierite) forming material as shown in batch No. 1 of Table 3. Here, an average particle diameter (μm) of these substrates is also shown in parentheses for a reference purpose. First, hydrotalcite as a layered double hydroxide having characteristics shown in Table 2 as type 1 was added to the above-mentioned ceramic forming material with an amount shown in Table 4 and mixed. Then, resin foam as a pore-forming agent, methyl cellulose as a binder, and potassium laurate as a dispersant are respectively added with an amount shown in Table 4 by superaddition to 100 parts by mass of a sum of the ceramics forming material and the layered double hydroxide to obtain a forming material. A predetermined amount of water was added thereto and mixed so that a ceramic kneaded clay was obtained. Subsequently, the ceramic kneaded clay thus obtained was shape formed to obtain a formed honeycomb article and the formed honeycomb article thus obtained was fired and a honeycomb structure was obtained. Here, composition of ceramic forming materials (including an average particle diameter of the substrate) used in other Examples and comparison examples are shown in Table 3 and in addition to the amount of the ceramic forming material and the layered double hydroxide used, amount of the resin foam used as the pore-forming agent, amount of methyl cellulose used as the binder, amount of potassium laurate used as the dispersant, and water used as the dispersion medium are shown in Table 4 by parts by mass by superaddition.

Sheet extrusion pressure of the clay was 9 MPa and the true stress was 21 kPa when true strain was 0.2 in the uniaxial compression test. When this clay was shape formed by an extrusion forming apparatus to have a honeycomb shape, a formed honeycomb article was shape formed without a clogging at the mouth ring or a defect in shaping. The formed honeycomb article thus obtained was dried by microwave and hot air and fired in a room air atmosphere at 1,420° C. for 7 hours. Dry breakage or breakage by firing could not be found in the honeycomb structure thus obtained. Crystal phase of the honeycomb structure thus obtained was identified by X-ray diffraction and it was found out that cordierite was the main phase. Porosity of the honeycomb structure was 50% and A-axis compression strength was 6 MPa. Characteristics of the ceramic kneaded clay, formed honeycomb article, and honeycomb structure thus obtained are shown in Table 5 together with evaluation results of other Examples and comparison examples. Here, symbols ⊚, ○, Δ, and X in Table 5 show evaluation results on forming defect, clogging at the mouth ring, crush, dry breakage, breakage, and melting by firing which were evaluated by the following criteria.

(Forming Defect)

⊚: Very good forming condition, ○: Although shaggy portions can be partially found, in good condition, Δ: In an acceptable level, though shaggy portions can be found on both a rib inside and on an outer wall, and X: Unacceptable level in which shaggy portions can be found on both a rib inside and on an outer wall.

(Clogging at Mouth Ring)

⊚: No clogging, ○: Clogging occurs only in one rib, Δ: Acceptable though clogging occurs in a plurality of ribs, and X: Unacceptable due to clogging which occurs in a plurality of ribs.

(Crush)

⊚: No crushed cell when formed article and shape of the cell after drying is similar to the shape of the mouth ring slit, Δ: Although cells are crushed when formed article and shape of the cell after drying is not similar to the shape of the mouth ring slit, if a light is irradiated from one edge surface of the formed article in extrusion direction and the light is observed from the other edge surface, there is no cell which does not allow the light to transmit due to the crush, and X: A cell is crushed when formed article, shape of the cell after drying is not similar to the shape of the mouth ring slit, and if a light is irradiated from one edge surface of the formed article in extrusion direction and the light is observed from the other edge surface, there exists a cell which does not allow the light to transmit due to the crush.

(Dry Breakage)

⊚: No dry breakage, ○: Only a surface layer is slightly cracked with the depth of less than 1 cm from the edge surface but the cracked portion can be easily cut out in edge surface cutting after drying, Δ: Although the edge surface is cracked with the depth of 1 cm or more, the cracked portion can be cut out in the edge surface cutting after drying, and X: The edge surface is cracked with the depth of 1 cm or more and cannot be cut out in the edge surface cutting after drying.

(Breakage)

⊚: No breakage, and X: There exists a breakage.

(Melting by Firing)

⊚: Dimensional shrinkage is within a range of 10% and external view is similar to a dried body, Δ: Dimensional shrinkage is 10% or more and external view is similar to a dried body, and X: Dimensional shrinkage is 10% or more and external view is not similar to the dried body.

Examples 2 to 25, Comparison Examples 1 to 4

Using forming materials of batches No. 2 to 25 and 31 to 34 including the composition shown in Table 3, ceramic kneaded clays including respective amount of materials shown in Table 4 were prepared. That is, in addition to the amount of the respective usage of the ceramic forming material and layered double hydroxide, the amount of the resin foam used as the pore-forming agent, the amount of methyl cellulose used as the binder, and the amount of potassium laurate used as the dispersant are shown by superaddition to 100 parts by mass which is a sum of the ceramic forming material and the layered double hydroxide. Predetermined amount of water shown in Table 4 was added to the forming material thus obtained and the ceramic kneaded clay was obtained. Except for the above, similar procedures as those of the Example 1 were taken to obtain the ceramic kneaded clays, formed honeycomb articles, and honeycomb structures according to the Examples 2 to 25 and comparison examples 1 to 4. Evaluation results of each characteristic of the ceramic kneaded clays, formed honeycomb articles, and honeycomb structures thus obtained are shown in Table 5.

Examples 26 to 30

In these Examples, similar procedures as those in the Example 1 were taken except that kaolin, alumina, and titanium oxide with the amounts shown in batches No. 26 to 30 in Table 3 were used as the ceramics forming material, each of 5 parts by mass of layered double hydroxides shown in Table 4 were added to the above-mentioned ceramics forming material and mixed so that the total amount becomes 100 parts by mass to obtain ceramic kneaded clays, resin foam as the pore-forming agent, methyl cellulose as the binder, and potassium laurate as the dispersant were added thereto by superaddition with the amount shown in Table 4 to 100 parts by mass of a sum of the ceramic forming material and the layered double hydroxide, water as the dispersion medium was used by superaddition with the amount shown in Table 4 and the honeycomb structure was fired in a room air atmosphere at 1,500° C. for four hours. Evaluation results of each characteristic of the ceramic kneaded clays, formed honeycomb articles, and honeycomb structures thus obtained are shown in Table 5.

TABLE 3

| Batch No. | Ceramic forming material | | | | | |
|---|---|---|---|---|---|---|
| | Talc | Kaolin | Alumina | Aluminum hydroxide | Silica | Titanium oxide |
| 1 | 34 (25 μm) | 19 (5 μm) | 13 (5 μm) | 15 (5 μm) | 15 (30 μm) | 0 |
| 2 | 34 (25 μm) | 19 (5 μm) | 13 (5 μm) | 15 (5 μm) | 15 (30 μm) | 0 |

TABLE 3-continued

| Batch No. | Ceramic forming material | | | | | |
|---|---|---|---|---|---|---|
| | Talc | Kaolin | Alumina | Aluminum hydroxide | Silica | Titanium oxide |
| 3 | 34 (25 μm) | 19 (5 μm) | 13 (5 μm) | 15 (5 μm) | 15 (30 μm) | 0 |
| 4 | 34 (25 μm) | 19 (5 μm) | 13 (5 μm) | 15 (5 μm) | 15 (30 μm) | 0 |
| 5 | 37 (25 μm) | 18.5 (5 μm) | 13.5 (5 μm) | 15 (5 μm) | 14 (30 μm) | 0 |
| 6 | 25 (25 μm) | 20 (5 μm) | 12.5 (5 μm) | 12.5 (5 μm) | 20 (30 μm) | 0 |
| 7 | 25 (25 μm) | 20 (5 μm) | 12.5 (5 μm) | 12.5 (5 μm) | 20 (30 μm) | 0 |
| 8 | 23 (25 μm) | 18 (5 μm) | 13 (5 μm) | 13 (5 μm) | 22 (30 μm) | 0 |
| 9 | 19 (25 μm) | 18 (5 μm) | 12 (5 μm) | 12 (5 μm) | 24 (30 μm) | 0 |
| 10 | 15 (25 μm) | 18 (5 μm) | 12 (5 μm) | 12 (5 μm) | 26 (30 μm) | 0 |
| 11 | 12 (25 μm) | 18 (5 μm) | 12 (5 μm) | 12 (5 μm) | 28 (30 μm) | 0 |
| 12 | 0 | 13 (5 μm) | 4 (5 μm) | 4 (5 μm) | 39 (30 μm) | 0 |
| 13 | 34 (25 μm) | 19 (5 μm) | 13 (5 μm) | 15 (5 μm) | 15 (30 μm) | 0 |
| 14 | 34 (25 μm) | 19 (5 μm) | 13 (5 μm) | 15 (5 μm) | 15 (30 μm) | 0 |
| 15 | 33 (25 μm) | 19 (5 μm) | 14 (5 μm) | 14 (5 μm) | 16 (30 μm) | 0 |
| 16 | 34 (25 μm) | 19 (5 μm) | 14 (5 μm) | 14 (5 μm) | 15 (30 μm) | 0 |
| 17 | 34 (25 μm) | 19 (5 μm) | 14 (5 μm) | 14 (5 μm) | 15 (30 μm) | 0 |
| 18 | 34 (25 μm) | 19 (5 μm) | 14 (5 μm) | 14 (5 μm) | 15 (30 μm) | 0 |
| 19 | 34 (25 μm) | 19 (5 μm) | 13 (5 μm) | 15 (5 μm) | 15 (30 μm) | 0 |
| 20 | 34 (25 μm) | 19 (5 μm) | 13 (5 μm) | 15 (5 μm) | 15 (30 μm) | 0 |
| 21 | 34 (25 μm) | 19 (5 μm) | 13 (5 μm) | 15 (5 μm) | 15 (30 μm) | 0 |
| 22 | 34 (25 μm) | 19 (5 μm) | 13 (5 μm) | 15 (5 μm) | 15 (30 μm) | 0 |
| 23 | 34 (25 μm) | 19 (5 μm) | 13 (5 μm) | 15 (5 μm) | 15 (30 μm) | 0 |
| 24 | 34 (25 μm) | 19 (5 μm) | 13 (5 μm) | 15 (5 μm) | 15 (30 μm) | 0 |
| 25 | 34 (25 μm) | 19 (5 μm) | 13 (5 μm) | 15 (5 μm) | 15 (30 μm) | 0 |
| 26 | 0 | 8 (3 μm) | 47 (2 μm) | 0 | 0 | 40 (0.2 μm) |
| 27 | 0 | 8 (3 μm) | 47 (2 μm) | 0 | 0 | 40 (0.2 μm) |
| 28 | 0 | 8 (3 μm) | 47 (2 μm) | 0 | 0 | 40 (0.2 μm) |
| 29 | 0 | 8 (3 μm) | 47 (2 μm) | 0 | 0 | 40 (0.2 μm) |
| 30 | 0 | 8 (3 μm) | 47 (2 μm) | 0 | 0 | 40 (0.2 μm) |
| 31 | 35 (25 μm) | 20 (5 μm) | 14 (5 μm) | 15.5 (5 μm) | 15.5 (30 μm) | 0 |
| 32 | 34 (25 μm) | 19 (5 μm) | 13 (5 μm) | 15 (5 μm) | 15 (30 μm) | 0 |
| 33 | 34 (25 μm) | 19 (5 μm) | 13 (5 μm) | 15 (5 μm) | 15 (30 μm) | 0 |
| 34 | 34 (25 μm) | 19 (5 μm) | 13 (5 μm) | 15 (5 μm) | 15 (30 μm) | 0 |

TABLE 4

| Batch No. | Ceramic forming material | Type of layered double hydroxide | Added amount of layered double hydroxide | Resin foam | Binder | Surfactant | Water |
|---|---|---|---|---|---|---|---|
| 1 | 96 | 1 | 4 | 9 | 3 | 0.1 | 20 |
| 2 | 96 | 1 | 4 | 4.5 | 3 | 0.1 | 22 |
| 3 | 96 | 1 | 4 | 13.5 | 3 | 0.1 | 17 |
| 4 | 96 | 1 | 4 | 18 | 3 | 0.1 | 15 |
| 5 | 98 | 1 | 2 | 9 | 3 | 0.1 | 21 |
| 6 | 94 | 1 | 10 | 9 | 3 | 0.1 | 19 |
| 7 | 90 | 1 | 10 | 18 | 3 | 0.1 | 18 |
| 8 | 88 | 1 | 12 | 18 | 3 | 0.1 | 18 |
| 9 | 85 | 1 | 15 | 18 | 3 | 0.1 | 18 |
| 10 | 82 | 1 | 18 | 18 | 3 | 0.1 | 17 |
| 11 | 80 | 1 | 20 | 18 | 3 | 0.1 | 17 |
| 12 | 60 | 1 | 40 | 18 | 3 | 0.1 | 14 |
| 13 | 96 | 1 | 4 | 9 | 3 | 0.05 | 24 |
| 14 | 96 | 1 | 4 | 9 | 3 | 0.15 | 20 |
| 15 | 96 | 2 | 4 | 9 | 3 | 0.1 | 20 |
| 16 | 96 | 3 | 4 | 9 | 3 | 0.1 | 21 |
| 17 | 96 | 4 | 4 | 9 | 3 | 0.1 | 21 |
| 18 | 96 | 5 | 4 | 9 | 3 | 0.1 | 22 |
| 19 | 96 | 6 | 4 | 9 | 3 | 0.1 | 21 |
| 20 | 96 | 7 | 4 | 9 | 3 | 0.1 | 21 |
| 21 | 96 | 8 | 4 | 9 | 3 | 0.1 | 22 |
| 22 | 96 | 9 | 4 | 9 | 3 | 0.1 | 21 |
| 23 | 96 | 10 | 4 | 9 | 3 | 0.1 | 21 |
| 24 | 96 | 11 | 4 | 9 | 3 | 0.1 | 21 |
| 25 | 96 | 12 | 4 | 9 | 3 | 0.1 | 22 |
| 26 | 95 | 1 | 5 | 9 | 3 | 0.1 | 19 |
| 27 | 95 | 9 | 5 | 9 | 3 | 0.1 | 20 |
| 28 | 95 | 10 | 5 | 9 | 3 | 0.1 | 20 |
| 29 | 95 | 11 | 5 | 9 | 3 | 0.1 | 20 |
| 30 | 95 | 12 | 5 | 9 | 3 | 0.1 | 20 |
| 31 | 100 | — | 0 | 9 | 3 | 0.1 | 23 |
| 32 | 96 | 1 | 4 | 52 | 3 | 0.1 | 15 |

TABLE 4-continued

| Batch No. | Ceramic forming material | Type of layered double hydroxide | Added amount of layered double hydroxide | Resin foam | Binder | Surfactant | Water |
|---|---|---|---|---|---|---|---|
| 33 | 96 | 1 | 4 | 1 | 3 | 0.1 | 28 |
| 34 | 96 | 1 | 4 | 9 | 3 | 0.1 | 11 |

TABLE 5

| | Batch No. | Sheet extrusion pressure (MPa) | Pressure to 20% strain (MPa) | Forming defect | Clogging at base | Crush | Dry breakage | Breakage | Melting by firing | Porosity (%) | A-axis compressive strength (Mpa) |
|---|---|---|---|---|---|---|---|---|---|---|---|
| Example 1 | 1 | 8 | 21 | ◎ | ◎ | ◎ | ◎ | ◎ | ◎ | 59 | 6 |
| Example 2 | 2 | 7 | 18 | ◎ | ◎ | ◎ | ◎ | ◎ | ◎ | 51 | 10 |
| Example 3 | 3 | 10 | 23 | ○ | ◎ | ◎ | ◎ | ◎ | ◎ | 62 | 4 |
| Example 4 | 4 | 12 | 24 | ○ | ○ | ◎ | ◎ | ○ | ◎ | 66 | 3 |
| Example 5 | 5 | 10 | 23 | ○ | ◎ | ◎ | ◎ | ◎ | ◎ | 60 | 5 |
| Example 6 | 6 | 6 | 24 | ◎ | ◎ | ◎ | ◎ | ◎ | ◎ | 59 | 5 |
| Example 7 | 7 | 11 | 23 | ◎ | ◎ | ◎ | ◎ | ○ | ◎ | 65 | 3 |
| Example 8 | 8 | 11 | 23 | ◎ | ◎ | ◎ | ◎ | ◎ | ◎ | 65 | 3 |
| Example 9 | 9 | 10 | 23 | ◎ | ◎ | ◎ | ◎ | ◎ | ◎ | 65 | 3 |
| Example 10 | 10 | 10 | 23 | ◎ | ◎ | ◎ | ◎ | ◎ | ◎ | 66 | 3 |
| Example 11 | 11 | 10 | 22 | ◎ | ◎ | ◎ | ◎ | ◎ | ◎ | 66 | 3 |
| Example 12 | 12 | 8 | 21 | ◎ | ◎ | ◎ | ○ | ◎ | ◎ | 63 | 4 |
| Example 13 | 13 | 10 | 23 | Δ | ◎ | ◎ | ◎ | ◎ | ◎ | 58 | 6 |
| Example 14 | 14 | 7 | 19 | ◎ | ◎ | ◎ | ◎ | ◎ | ◎ | 59 | 5 |
| Example 15 | 15 | 9 | 22 | ◎ | ◎ | ◎ | ◎ | ◎ | ◎ | 58 | 6 |
| Example 16 | 16 | 10 | 22 | ◎ | ◎ | ◎ | ◎ | ◎ | ◎ | 59 | 5 |
| Example 17 | 17 | 9 | 21 | ◎ | ◎ | ◎ | ◎ | ◎ | ◎ | 58 | 6 |
| Example 18 | 18 | 10 | 21 | ◎ | ◎ | ◎ | ◎ | ◎ | ◎ | 58 | 6 |
| Example 19 | 19 | 10 | 22 | ○ | ◎ | ◎ | ◎ | ◎ | ◎ | 58 | 5 |
| Example 20 | 20 | 11 | 23 | ○ | ◎ | ◎ | ◎ | ◎ | ◎ | 59 | 5 |
| Example 21 | 21 | 10 | 23 | ○ | ◎ | ◎ | ◎ | ◎ | ◎ | 59 | 5 |
| Example 22 | 22 | 11 | 23 | ○ | ◎ | ◎ | ◎ | ◎ | ◎ | 58 | 6 |
| Example 23 | 23 | 11 | 22 | ○ | ◎ | ◎ | ◎ | ◎ | ◎ | 57 | 7 |
| Example 24 | 24 | 10 | 22 | ○ | ◎ | ◎ | ◎ | ◎ | ◎ | 58 | 6 |
| Example 25 | 25 | 11 | 22 | ○ | ◎ | ◎ | ◎ | ◎ | ◎ | 57 | 7 |
| Example 26 | 26 | 9 | 21 | ◎ | ◎ | ◎ | ◎ | ◎ | ◎ | 57 | 8 |
| Example 27 | 27 | 10 | 23 | ◎ | ◎ | ◎ | ◎ | ◎ | ◎ | 56 | 9 |
| Example 28 | 28 | 11 | 23 | ◎ | ◎ | ◎ | ◎ | ◎ | ◎ | 57 | 8 |
| Example 29 | 29 | 11 | 22 | ◎ | ◎ | ◎ | ◎ | ◎ | ◎ | 57 | 9 |
| Example 30 | 30 | 10 | 23 | ◎ | ◎ | ◎ | ◎ | ◎ | ◎ | 56 | 9 |
| Comparison example 1 | 31 | 13 | 42 | X | X | Product could not be obtained after drying | | | | — | |
| Comparison example 2 | 32 | 11 | 24 | Δ | Δ | Δ | ○ | X | ◎ | 68 | 1 |
| Comparison example 3 | 33 | 8 | 21 | ◎ | ◎ | ◎ | ◎ | ◎ | ◎ | 38 | 20 |
| Comparison example 4 | 34 | 21 | 38 | X | X | Product could not be obtained after drying | | | | — | |

In every Example, porosity was between 51 and 66%, which was high, and characteristics of the formed honeycomb article were superior. Among them, Example 4 (batch No. 4), Example 7 (batch No. 7), and Example 8 (batch No. 8) which used the ceramic kneaded clay prepared by using 18 parts by mass of resin foam as the pore-forming agent by superaddition to 100 parts by mass of a sum of the ceramics forming material and the layered double hydroxide have high porosity of between 65 and 66%. Among them, the Example 8, which has the low sheet extrusion pressure of 10 MPa shows superior characteristics in all the evaluation criteria. It is assumed that the low sheet extrusion pressure is due to usage of 20 parts by mass of the layered double hydroxide, which is a relatively large amount. Moreover, in the Examples 4 and 7, one that includes more layered double hydroxide shows smaller sheet extrusion pressure and superior characteristics. Meanwhile, among the Examples which used the ceramic kneaded clay prepared by using 9 parts by mass of resin foam as the pore-forming agent by superaddition to 100 parts by mass of a sum of the ceramics forming material and the layered double hydroxide, Examples 14 to 18 showed superior characteristics. However, the Example 13 for which surfactant as a dispersant was used only 0.05 parts by mass, which is a small amount, forming defect could be found, although the defect was within an acceptable range. It is assumed that this was due to aggregation of particles or bad slipping property of the particles caused by lack of the dispersant. Here, powder X-ray diffraction was carried out to the Example 12 which showed slightly inferior characteristics in dry breakage and the Example 13 which did not show sufficient characteristics in formability. When the composition (crystal phase) of the ceramic structure obtained by the diffraction was examined, the Examples included impurity other than cordierite (spinel or the like) and the Example 13 had more impurity than the Example 12.

The Examples 26 to 30 for which a mixture including kaolin, alumina, and titanium oxide which are kinds of aluminum titanate forming material was used as ceramic forming material showed characteristics similar to those of other Examples for which talc, kaolin, alumina, aluminum hydroxide, and silica which are kinds of cordierite forming material were used as ceramic forming material. Meanwhile, if consideration is given to the comparison examples, in the comparison example 1 for which the layered double hydroxide was not used, the ceramic kneaded clay which can shape form could not be obtained. In the comparison example 4 to which 9 parts by mass of pore-forming agent were added by superaddition similarly to most of the Examples, sheet extrusion pressure was high at 21 MPa because the amount of water as the dispersion medium was 13 parts by mass, which is relatively small, and the ceramic kneaded clay had poor fluidity. Therefore, a formed article could not be obtained. Needless to say, in the comparison example 2 in which 52 parts by mass of pore-forming agent were used, formability was significantly bad and although dry breakage or melting by firing due to firing could not be found, the honeycomb structure which can be practically used could not be obtained. Moreover, in the comparison example 3 to which only 1 part by mass of the pore-forming agent was added by superaddition, usage of water as the dispersion medium was 28 parts by mass, which is relatively large, sheet extrusion pressure was 8 MPa, which is a low value even when compared to the Examples of the present invention. Although the sheet extrusion pressure satisfies a requirement of the present invention, porosity of the comparison example 3 was 38% which is far from the level required in the present application.

INDUSTRIAL APPLICABILITY

The ceramic kneaded clay, the oxide-ceramic formed article, especially the formed honeycomb article and the honeycomb structure according to the present invention, may be appropriately used as members of various apparatuses and machineries which are effective to prevent environmental pollution and global warming in various fields such as chemistry, electricity, iron and steel, and industrial waste disposal. Here, because a small amount of water is used for the ceramic kneaded clay and oxide-ceramic formed article, especially the formed honeycomb article, fuel used for drying can be saved in firing. Moreover, despite the superior characteristic that a structure having a desired high porosity can be obtained, usage of the organic binder can be reduced and therefore emission of carbon dioxide released to the environment in calcinations can be reduced. Therefore, it is apparent that the present invention has a high industrial applicability.

What is claimed is:

1. An oxide-ceramic forming clay, comprising:
    an oxide-ceramic forming material;
    a layered double hydroxide;
    organic binder;
    a pore-forming agent; and
    water,
    wherein:
    (i) the amount of the pore-forming agent is between 3 and 50 parts by mass by superaddition to 100 parts by mass of a sum of the oxide-ceramic forming material and the layered double hydroxide, (ii) a sum of the pore-forming agent and an organic binder is between 5 and 55 parts by mass also by superaddition, (iii) the amount of pore-forming agent is larger than the amount of organic binder, (iv) the layered double hydroxide is a layered double hydroxide expressed by the following formula (I):

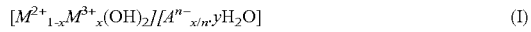 (I)

(in the formula (I), $M^{2+}$, $M^{3+}$, and $A^{n-}$ respectively express bivalent cation, trivalent cation, or anion, n expresses valence of anion and $1 \leq n \leq 3$, x expresses composition ratio of trivalent cation in a sum of the bivalent cation ($M^{2+}$) and the trivalent cation ($M^{3+}$) and at the same time expresses a value within a range of between 0.1 and 0.4, and y expresses number of moles of water), and
    (v) the oxide-ceramic forming clay has a sheet extrusion pressure that is 20 Mpa or less.

2. The oxide-ceramic forming clay according to claim 1, wherein a true stress is at least 10 kPa when true strain is 0.2 in a uniaxial compression test of the oxide-ceramic forming clay.

3. The oxide-ceramic forming clay according to claim 1, wherein mass of the layered double hydroxide occupies 0.5 to 50 parts by mass in 100 parts by mass of a sum of the oxide-ceramic forming material and the layered double hydroxide.

4. The oxide-ceramic forming clay according to claim 1, wherein mass of the layered double hydroxide occupies 1 to 18 parts by mass in 100 parts by mass of a sum of the oxide-ceramic forming material and the layered double hydroxide.

5. The oxide-ceramic forming clay according to claim 1, wherein the oxide-ceramic forming clay further includes at least one of a dispersant and a surfactant and a total content thereof is less than 0.2 parts by mass by superaddition to 100 parts by mass of the sum of the oxide-ceramic forming material and the layered double hydroxide.

6. The oxide-ceramic forming clay according to claim 1, wherein the layered double hydroxide is hydrotalcite which is expressed by the following formula (II):

 (II)

(In the above formula (II), z expresses composition ratio of Al in a sum of Mg and Al and also expresses a value within a range of between 0.1 and 0.4, and m expresses a number of moles of water in the hydrotalcite).

7. The oxide-ceramic forming clay according to claim 1, wherein the layered double hydroxide is hydrotalcite which is expressed by the following formula (III):

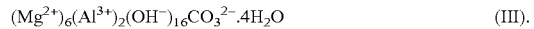 (III).

8. An oxide-ceramic formed article obtained by extrusion forming the oxide-ceramic forming clay according to claim 1.

9. The oxide-ceramic formed article according to claim 8, wherein the formed article is formed to have a honeycomb shape by extrusion forming.

10. The oxide-ceramic forming clay according to claim 1, wherein the amount of water is 10-24 parts by mass relative to 100 parts by mass of the sum of the oxide-ceramic forming material and the layered double hydroxide.

11. The oxide-ceramic forming clay according to claim 1, further comprising a surfactant, wherein the amount of surfactant is 0.1 parts by mass or less relative to 100 parts by mass of the sum of the oxide-ceramic forming material and the layered double hydroxide.

12. The oxide-ceramic forming clay according to claim 1, wherein the amount of organic binder is 5 parts by mass or less by superaddition to 100 parts by mass of the sum of the oxide-ceramic forming material and the layered double hydroxide.

13. A manufacturing method of an oxide-ceramic forming clay by mixing:
    an oxide-ceramic forming material and a layered double hydroxide as the ceramic forming material so that sum of the two becomes 100 parts by mass; and
    a pore-forming agent so that amount thereof is between 3 and 50 parts by mass by superaddition to 100 parts by mass of the prepared ceramic forming material;

an organic binder; and
water,
wherein
(i) a sum of the pore-forming agent and an organic binder is between 5 and 55 parts by mass also by superaddition;
(ii) the amount of pore-forming agent is larger than the amount of organic binder;
(iii) the layered double hydroxide is a layered double hydroxide expressed by the following formula (I):

$$[M^{2+}{}_{1-x}M^{3+}{}_x(OH)_2][A^{n-}{}_{x/n}.yH_2O] \quad (I)$$

(in the formula (I), $M^{2+}$, $M^{3+}$, and $A^{n-}$ respectively express bivalent cation, trivalent cation, or anion, n expresses valence of anion and is $1 \leq n \leq 3$, x expresses composition ratio of trivalent cation in a sum of the bivalent cation ($M^{2+}$) and the trivalent cation ($M^{3+}$) and at the same time expresses a value within a range of between 0.1 and 0.4, and y expresses number of moles of water), and
(iv) the oxide-ceramic forming clay has a sheet extrusion pressure of 20 Mpa or less.

14. The manufacturing method of an oxide-ceramic forming clay according to claim 13,
wherein a true stress is at least 10 kPa when the true stress necessary for the oxide-ceramic forming clay to provide true strain of 0.2 in a uniaxial compression test is examined.

15. The manufacturing method of an oxide-ceramic forming clay according to claim 13,
wherein the layered double hydroxide is prepared so that content thereof in the ceramic forming material is between 0.5 and 50 parts by mass.

16. The manufacturing method of an oxide-ceramic forming clay according to claim 13,
wherein hydrotalcite which is expressed by the following formula (II) is used as the layered double hydroxide:

$$Mg_{1-z}Al_z(OH)_2(CO_3)_{z/2}.mH_2O \quad (II)$$

(In the above formula (II), z expresses composition ratio of Al in a sum of Mg and Al and also expresses a value within a range of between 0.1 and 0.4, and m expresses a number of moles of water in the hydrotalcite).

17. The manufacturing method of an oxide-ceramic forming clay according to claim 13,
wherein hydrotalcite which is expressed by the following formula (III) is used as the layered double hydroxide:

$$(Mg^{2+})_6(Al^{3+})_2(OH^-)_{16}CO_3^{2-}.4H_2O \quad (III).$$

18. A manufacturing method of a ceramic formed article for obtaining a ceramic formed article by forming the oxide-ceramic forming clay obtained by the method according to claim 13.

19. The manufacturing method of a ceramic formed article according to claim 18, wherein the ceramic forming clay is shaped to have a honeycomb shape so that a formed honeycomb article is obtained.

20. A manufacturing method of a ceramic structure for obtaining a ceramic structure by firing the ceramic formed article obtained by a method according to claim 18.

* * * * *